(12) United States Patent
Chiu et al.

(10) Patent No.: US 10,411,445 B2
(45) Date of Patent: Sep. 10, 2019

(54) CLAMPING DEVICE

(71) Applicants: Chin-Hung Chiu, Taichung (TW); Chin-Long Chiu, Taichung (TW)

(72) Inventors: Chin-Hung Chiu, Taichung (TW); Chin-Long Chiu, Taichung (TW)

(*) Notice: Subject to any disclaimer, the term of this patent is extended or adjusted under 35 U.S.C. 154(b) by 98 days.

(21) Appl. No.: 15/495,995

(22) Filed: Apr. 25, 2017

(65) Prior Publication Data

US 2018/0309271 A1    Oct. 25, 2018

(51) Int. Cl.
*B25B 7/02* (2006.01)
*H02G 1/06* (2006.01)

(52) U.S. Cl.
CPC ................... *H02G 1/06* (2013.01)

(58) Field of Classification Search
USPC .............. 81/424.5, 426, 426.5, 418
See application file for complete search history.

(56) References Cited

U.S. PATENT DOCUMENTS

| | | | | |
|---|---|---|---|---|
| 2,842,997 | A * | 7/1958 | Wentling | B25B 7/02 43/53.5 |
| 5,572,914 | A * | 11/1996 | Coleman | B25B 7/02 30/134 |
| 5,855,048 | A * | 1/1999 | Synowicki | A44C 17/043 29/10 |
| 7,481,019 | B2 * | 1/2009 | Rosenberg | A01K 83/06 43/44.4 |
| 2008/0178707 | A1 * | 7/2008 | Stevens | B25B 7/02 81/9.43 |
| 2013/0160615 | A1 * | 6/2013 | Kawai | B25B 7/02 81/424.5 |

* cited by examiner

*Primary Examiner* — Joseph J Hail
*Assistant Examiner* — Shantese L McDonald

(57) ABSTRACT

A clamping device includes two parts which are pivotably connected to each other by a pivot joint. Each part includes a jaw and a handle. Each jaw has an engaging portion and a clamping portion defined in the inside thereof. A groove is defined in the engaging portion of each jaw so as to accommodate a wire holder. The groove of the engaging portion extends from the nose of each jaw and toward the pivot joint by an angle relative the axis of the inside of each jaw. The groove opens through the nose and one side of each jaw.

7 Claims, 5 Drawing Sheets

CLAMPING DEVICE

BACKGROUND OF THE INVENTION

1. Fields of the Invention

The present invention relates to a clamping device, and more particularly, to a pair of pliers having an engaging portion for engaging a wire holder while inherent functions of the pliers are maintained.

2. Descriptions of Related Art

The conventional wiring processes are to manage and extend wires through pipes and holes, so that the wires are required to be pulled and guided through the pipes and holes properly.

Generally, the workers extend one end of the wire through a wire holder, and the wire is secured to the wire holder. The wire holder is then clamped by a pair of pliers, the workers pull the wire holder directly to drag the wire to a desired position. The wire holder is clamped by the clamping portions of the jaws of the pliers, the cable or outer coat of the wire holder can be easily damaged or broken during dragging. This is because the clamping portions of the jaws have teeth. A device that is specifically designed to clamp the wire holder is developed, the device does not damage the wire holder. Nevertheless, the device increases the number of tools that the workers carry and the weight becomes a burden for the workers.

The present invention intends to provide a clamping device which includes a groove defined in each of the jaws so as to engage the wire holder without damaging the wire holder.

SUMMARY OF THE INVENTION

The present invention relates to a clamping device and comprises two parts which are pivotably connected to each other by a pivot joint. Each part has a jaw and a handle respectively on two ends thereof. The pivot joint is located between the jaw and the handle. The jaws are moved away from each other or toward each other, and the handles are moved away from each other or toward each other. Each jaw has an engaging portion and a clamping portion defined in the inside thereof. A groove is defined in the engaging portion of each jaw so as to accommodate a wire holder. The groove of the engaging portion extends from the nose of each jaw and toward the pivot joint by an angle relative the axis of the inside of each jaw. Each clamping portion has teeth defined therein.

Preferably, the groove of each jaw is a concaved groove which has a semi-circular end shape. A rounded corner is defined at the connection portion between each of two sides of the groove and the teeth.

Preferably, each of the jaws has a curved and concaved portion. The two curved and concaved portions are located to face each other, and each curved and concaved portion includes a cutting portion.

Preferably, the angle is 5 to 10 degrees.

Preferably, the teeth of the clamping portion of each jaw are separated from each by different distances.

Preferably, the groove opens through the nose and one side of each jaw.

The present invention will become more apparent from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
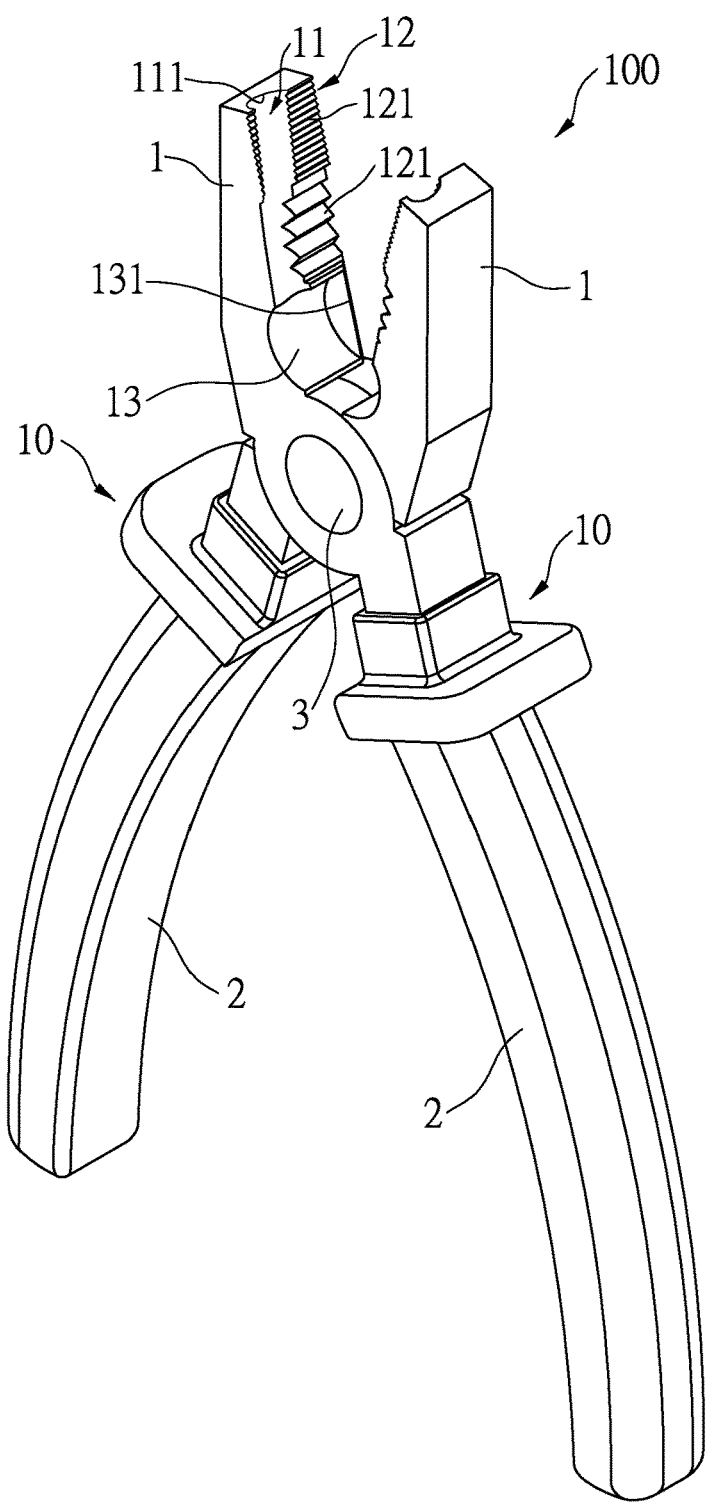
FIG. 1 is an exploded view of the clamping device of the present invention.
Figure 2:
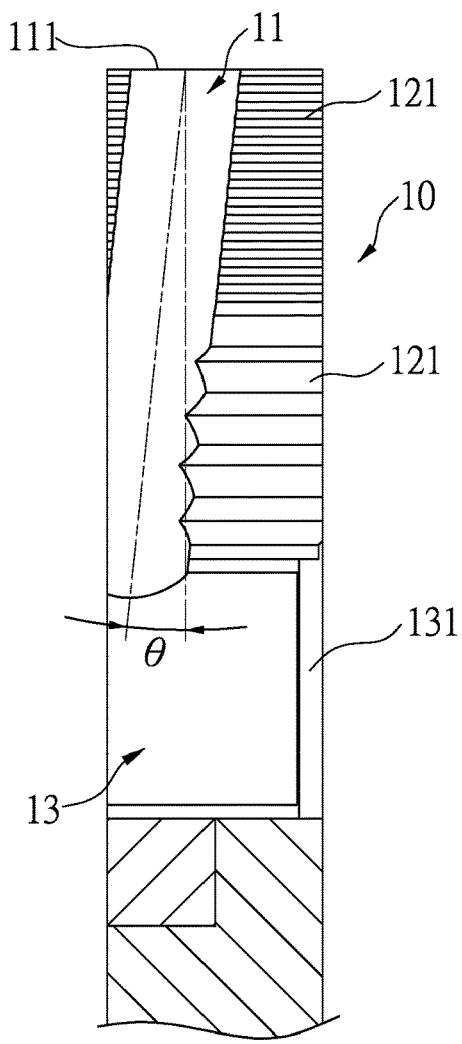
FIG. 2 is a cross sectional view to show the groove of each jaw of the clamping device of the present invention.

Referring to FIGS. 1 to 4, the clamping device 100 of the present invention comprises two parts 10 which are pivotably connected to each other by a pivot joint 3. Each part 10 includes a jaw 1 and a handle 2 respectively on two ends thereof, and the pivot joint 3 located between the jaw 1 and the handle 2. When operating the handles 2, the jaws 1 are moved away from each other or toward each other, and the handles 2 are moved away from each other or toward each other. Each jaw 1 has an engaging portion 11 and a clamping portion 12 defined in the inside thereof. A groove 111 is defined in the engaging portion 11 of each jaw 1 so as to accommodate a wire holder 200. The groove 111 of each jaw 1 is a concaved groove which has a semi-circular end shape. The groove 111 of the engaging portion 11 extends from the nose of each jaw 1 and toward the pivot joint 3 by an angle $\theta$ relative the axis of the inside of each jaw 1. Preferably, the angle $\theta$ is 5 to 10 degrees. Specifically, the groove 111 opens through the nose and one lateral side of each jaw 1. Each clamping portion 12 has teeth 121 defined therein, and the teeth 121 of the clamping portion 12 of each jaw 1 are separated from each by different distances. A rounded corner 112 is defined at the connection portion between each of two sides of the groove 111 and the teeth 121. Each of the jaws 1 has a curved and concaved portion 13, and the two curved and concaved portions 13 are located to face each other. Each curved and concaved portion 13 includes a cutting portion 131 so as to cut wires or the like.

Figure 3:
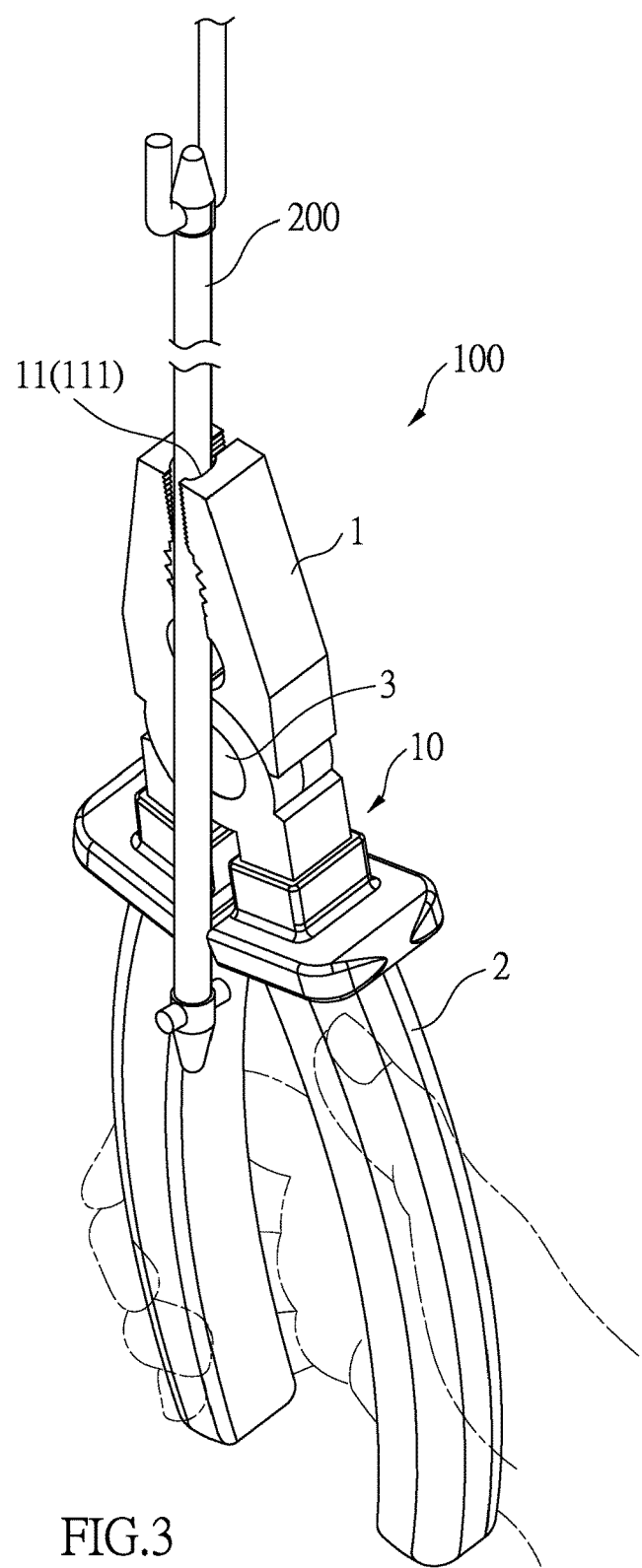
FIG. 3 shows that the clamping device of the present invention holds a wire holder.
Figure 4:
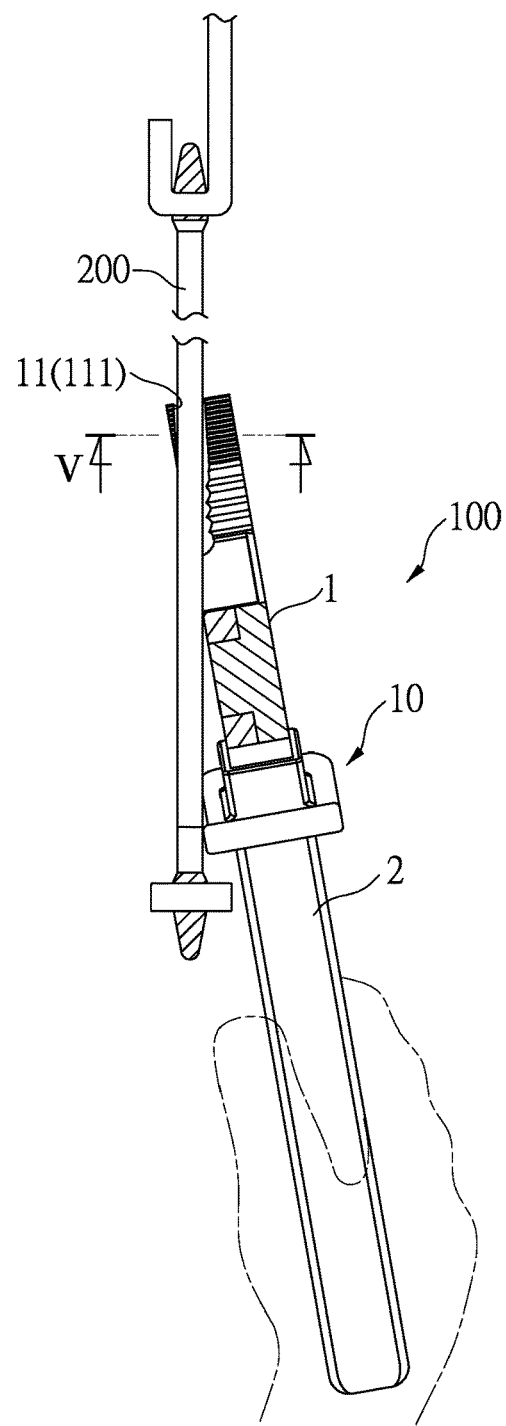
FIG. 4 is a partial cross sectional view to show that the clamping device of the present invention holds a wire holder.
Figure 5:
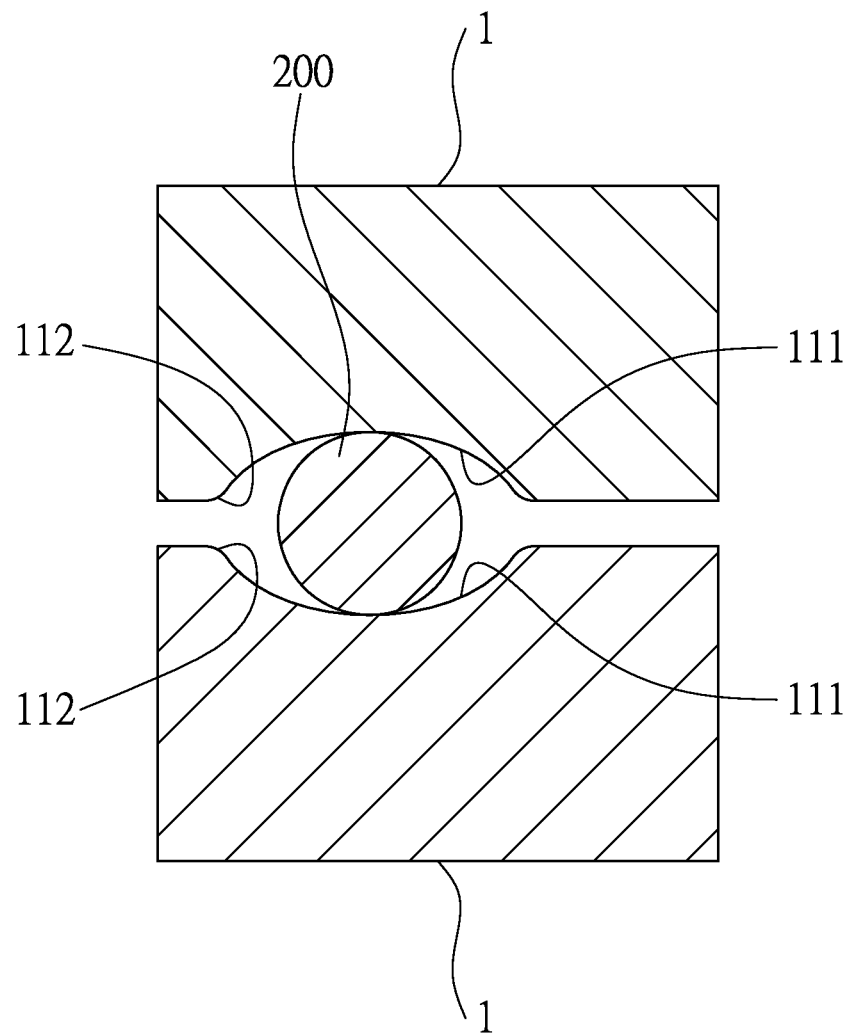
FIG. 5 is a cross sectional view, taken along line V-V in FIG. 4.

When in use, the wire holder 200 is held between the two grooves 111 of the two jaws 1. The wire holder 200 extends through the noses of the two jaws 1 and extends beyond the two respective lateral sides of the jaws 1 as shown in FIG. 3. The rounded corners 112 protect the wire holder 200 from being damaged as shown in FIG. 5.

The clamping device 100 maintains the inherent functions of pliers and further provides two grooves 111 to hold the wire holder 200 without damaging the wire holder 200. The clamping device 100 includes two cutting portions 131 to cut wires or the like. The two curved and concaved portions 13 are cooperated with each other to form an oval hole through which cables extend, and the coat of the cables can be peeled off from the cables.

While we have shown and described the embodiment in accordance with the present invention, it should be clear to those skilled in the art that further embodiments may be made without departing from the scope of the present invention.

What is claimed is:

1. A clamping device comprising:
two parts which are pivotably connected to each other by a pivot joint, each part having a jaw and a handle respectively on two ends thereof, the pivot joint located between the jaw and the handle, the jaws being moved away from each other or toward each other, and the handles being moved away from each other or toward each other, when the two parts are pivoted about the pivot joint, each jaw having an engaging portion and a clamping portion defined in an inside thereof, a groove defined in the engaging portion of each jaw, the groove of the engaging portion extending from a nose of each jaw and toward the pivot joint by an angle relative an axis of the inside of each jaw, the groove opening through the nose and one lateral side of each jaw so that when the clamping device is configured to clamp a wire holder, the wire holder is a straight or linear wire holder and extends through the noses of the two jaws and extends beyond the two respective lateral sides of the jaws, each clamping portion having teeth defined therein.

2. The clamping device as claimed in claim 1, wherein the groove of each jaw is a concaved groove which has a semi-circular end shape, a rounded corner is defined at a connection portion between each of two sides of the groove and the teeth.

3. The clamping device as claimed in claim 2 wherein each of the jaws has a curved and concaved portion, the two curved and concaved portions are located to face each other, each curved and concaved portion includes a cutting portion.

4. The clamping device as claimed in claim 1, wherein each of the jaws has a curved and concaved portion, the two curved and concaved portions are located to face each other, each curved and concaved portion includes a cutting portion.

5. The clamping device as claimed in claim 1, wherein the angle is 5 to 10 degrees.

6. The clamping device as claimed in claim 1, wherein each tooth of the clamping portion of each jaw is separated from each other by a different distance.

7. The clamping device as claimed in claim 5, wherein each tooth of the clamping portion of each jaw is separated from each other by a different distance.

\* \* \* \* \*